(12) United States Patent
Isomäki et al.

(10) Patent No.: US 7,920,499 B2
(45) Date of Patent: Apr. 5, 2011

(54) ACTIVATION OF SERVICES IN A COMMUNICATION SYSTEM

(75) Inventors: Markus Isomäki, Espoo (FI); Miikka Poikselkä, Espoo (FI); Simo Veikkolainen, Espoo (FI)

(73) Assignee: Nokia Corporation, Espoo (FI)

( * ) Notice: Subject to any disclaimer, the term of this patent is extended or adjusted under 35 U.S.C. 154(b) by 1014 days.

(21) Appl. No.: 10/809,710

(22) Filed: Mar. 26, 2004

(65) Prior Publication Data

US 2005/0135374 A1 Jun. 23, 2005

(30) Foreign Application Priority Data

Dec. 22, 2003 (GB) .................................. 0329707.4

(51) Int. Cl.
*H04H 20/71* (2008.01)
(52) U.S. Cl. ........ 370/312; 370/260; 370/261; 370/236; 455/518
(58) Field of Classification Search ........................ None
See application file for complete search history.

(56) References Cited

U.S. PATENT DOCUMENTS

| | | | | |
|---|---|---|---|---|
| 5,729,536 | A * | 3/1998 | Doshi et al. .................... | 370/398 |
| 6,477,150 | B1 * | 11/2002 | Maggenti et al. ............. | 370/312 |
| 6,725,053 | B2 * | 4/2004 | Rosen et al. ................... | 455/518 |
| 2005/0124365 | A1 * | 6/2005 | Balasuriya et al. ........... | 455/518 |

FOREIGN PATENT DOCUMENTS

WO    WO 02/093812 A2    11/2002

OTHER PUBLICATIONS

"Push-To-Talk Over Cellular (PoC); Signaling Flows; PoC Release 1.0", Signaling Flows V1.1.4 , XP-002321968, Oct. 2003, pp. 1-115.
"Push-To-Talk Over Cellular (PoC) User Plane; Transport Protocols; PoC Release 1.0" Transport Protocols V1.1.1, XP-002321969, Oct. 2003, pp. 1-37.
Wu et al., "*Use of Session Initiation Protocol (SIP) and Simple Object Access Protocol (SOAP) for Conference Floor Control*" XP-0150005760, Mar. 2, 2003, pp. 1-35.
Darilion K. et al., "*A Service Environment for Air Traffic Control Based on SIP*", IEEE, XP-010683069, Jan. 5, 2004, pp. 1-10.

* cited by examiner

*Primary Examiner* — Robert W Wilson
(74) *Attorney, Agent, or Firm* — Mintz Levin Cohn Ferris Glovsky and Popeo, P.C.

(57) ABSTRACT

A method in a communication system, a communication system and an application server embodying the method are disclosed. The method is for communication of information during establishment of a communication session. In the method, additional information is included in a message carrying information regarding a data communication media for a communication session. The additional information regards a floor status of the data communication media in relation to a party of the communication session. The message is sent from the communication system to a user equipment.

32 Claims, 3 Drawing Sheets

ACTIVATION OF SERVICES IN A COMMUNICATION SYSTEM

BACKGROUND OF THE INVENTION

1. Field of the Invention

The invention relates to communication systems, and in particular to activation of services in communication systems that facilitate packet data communication sessions.

2. Description of the Related Art

A communication system can be seen as a facility that enables communication sessions between two or more entities such as user equipment and/or other nodes associated with the communication system. The communication may comprise, for example, communication of voice, data, multimedia and so on. A session may, for example, be a telephone call type session between users or multi-way conference session, or a communication session between a user equipment and an application server (AS), such as a service provider server.

A communication system typically operates in accordance with a given standard or specification which sets out what the various entities associated with the communication system are permitted to do and how that should be achieved. For example, the standard or specification may define if the user, or more precisely, user equipment is provided with a circuit switched service and/or a packet switched service. Communication protocols and/or parameters which shall be used for the connection may also be defined. In other words, a specific set of "rules" on which the communication can be based on needs to be defined to enable communication by means of the system.

Communication systems providing wireless communication for user equipment are known. An example of the wireless systems is the public land mobile network (PLMN). The PLMNs are commonly based on cellular technology. In cellular systems, a base transceiver station (BTS) or similar access entity serves mobile user equipment (UE) via a wireless interface between these entities. The communication on the wireless interface between the user equipment and the elements of the communication network can be based on an appropriate communication protocol. The operation of the base station apparatus and other apparatus required for the communication can be controlled by one or several control entities. The various control entities may be interconnected.

One or more gateway nodes may also be provided for connecting the cellular access network to other networks e.g. to a public switched telephone network (PSTN) and/or other communication networks such as an IP (Internet Protocol) and/or other packet switched data networks. In such arrangement the mobile communications network provides an access network enabling a user with a wireless user equipment to access external networks, hosts, or services offered by specific service providers. The access point or gateway node of the mobile communication network then provides further access to an external network or an external host. For example, if the requested service is provided by a service provider located in other network, the service request is routed via the gateway to the service provider. The routing may be based on definitions in the mobile subscriber data stored by a mobile network operator.

An example of the type of services that may be offered for user such as the subscribers to a communication systems is the so called multimedia services. Some of the communication systems enabled to offer multimedia services are known as Internet Protocol (IP) Multimedia networks. IP Multimedia (IM) functionalities can be provided by means of an IP Multimedia Core Network (CN) subsystem, or briefly IP Multimedia subsystem (IMS). The IMS includes various network entities for the provision of the multimedia services. The IMS services are intended to offer, among other services, IP based packet data communication sessions between mobile user equipment.

In an packet data network a packet data carrier may be established to carry traffic flows over the network. An example of such a packet data carrier is a packet data protocol (PDP) context. A PDP context may be provided for various purposes, for example for transportation of signalling data and for transportation of payload data, i.e. for the control plane and for the user plane data communication. A data communication session between a user equipment and another party may be carried at least on the access network of the user equipment on a PDP context.

It is expected that various types of services are to be provided by means of different Application Servers (AS) over Internet Protocol Multimedia subsystem (IMS). Some of these services may be time critical. An example of the time-critical services that may be provided over the IMS are the so called direct voice communication services. A more specific example of these is the "Push-to-talk over Cellular" (PoC) service, also known as PTT, Push-To-Talk service. The direct voice communication services are intended to use the capabilities of the IP Multimedia Subsystem (IMS) for enabling IP connections for mobile user equipment and other parties of the communications, for example other mobile user equipment or entities associated with the network. The service allows the users to engage in immediate communication with one or more other users.

In PoC services communication between a user equipment and a PoC application server commonly occurs on a one-way data communications media. A user may open the data communications media by simply pushing a tangent key, for example a button on the keyboard of a user equipment or by otherwise activating the communications media. The activation means may be a specific button or tangent or any appropriate key of the keyboard. While a user speaks, the other user or users may listen. Bi-directional communication can be offered since all parties of the communications session may similarly communicate voice data with the PoC application server. The turns to speak are requested by activating the communication media, e.g. by pressing the push-to-talk button. The turns may be granted for example on a first come first served basis or based on priorities. Users can join the group session they wish to talk to and then activate the media to start talking.

In service application such as PoC one-to-one call the calling party may need to know when a 'floor' is granted for the calling party in the beginning of the call. The term 'floor' refers to data communication media resources that may be used for the communication of voice data.

A floor may be seen as a permission to temporarily access, manipulate or otherwise use a specific shared resource or a set of resources. A "floor" can be granted even when no data communication channel is yet available.

If no floor is granted, the calling party may not be able to start sending voice data to the PoC application server. Similarly the called party must know that the floor has been taken by the calling party. This must somehow be indicated to the parties during the call setup sequence.

In the prior art described, for example, by PoC Industry Consortium Specifications, the indication of a granted floor is sent through a specific floor control protocol, typically by means of a Real-time Transport protocol Control Protocol (RTCP). This approach requires creation and sending of separate messages for the floor status indications. In this approach a calling party of a PoC session has to send first an SIP INVITE message containing a Session Description Protocol (SDP) offer. After receiving this the PoC application server has to communicate in a separate message to the calling party an Real-time Transport protocol Control Protocol (RTCP) indication that a floor has been granted for use in the session.

Because PoC services do not commonly use preconditions there is no guarantee that media bearers are ready when a PoC application server sends one or more floor control messages. This may cause a problem, for example, when a user equipment is using a dedicated signalling PDP context, since the dedicated signalling PDP context does not allow transportation of RTCP traffic. For example, it is possible that no data carrier may have yet been activated for the data communication media at this point since the SDP answer has not yet been received. Thus the RTCP packet may need to be carried within some pre-existing data carrier, for example a pre-existing PDP context. However, if a user equipment is using a dedicated signalling PDP context, it is not allowed to transport Real-time Transport Protocol (RTP) nor Real-time Transport protocol Control Protocol (RTCP) packets within the PDP context. In this case the gateway between the access network and the data network will simply drop all incoming packets which do not comply with a acceptance policy of gateway and therefore a user equipment may not get any floor control messages prior secondary PDP context activation. It is only after receiving the final response carrying SDP answer to the initial INVITE message that the calling party can actually start sending media packets. Similarly on the called party side the PoC application server first sends an INVITE with an SDP offer. After receiving the final answer which carries an SDP answer, the PoC application server can send the called party an RTCP indication that the floor has been taken.

SUMMARY OF THE INVENTION

The embodiments aim to address the above described problems.

According to one embodiment, there is provided a method in a communication system for communication of information during establishment of a communication session. The method comprises including in a message carrying information regarding a data communication media for a communication session further information regarding a floor status of the data communication media in relation to a party of the communication session. The message is then sent from the communication system to a user equipment.

According to another embodiment, there is provided a communication system configured to provide communication sessions. The communication system comprises a data network for providing data communication resources and an application server connected to the data communication network. The application server is configured to include in a message carrying information regarding a data communication media for a communication session further information regarding a floor status of the data communication media in relation to a party of the communication session and to send the message to a user equipment via the data network.

According to yet another embodiment, there is provided an application server for provision of data communication sessions. The application server is configured to include in a message carrying information regarding a data communication media for a communication session further information regarding a floor status of the data communication media in relation of a party of the communication session and to send the message to a user equipment via the data network.

According to yet another embodiment, there is provided a message for describing a communication session. The message is configured to carry information regarding a data communication media for the communication session and information regarding a floor status of the data communication media in relation to a party of the communication session.

The embodiments of the invention may provide advantage in reducing the time and amount of messages required for setting up a voice or other data communication session for a user. This may be especially advantageous in service applications that are time critical. The embodiments may improve the usability of services. Benefits in using for example SDP messages instead of RTCP messages to carry status indications include the elimination of an additional RTCP packet. This may produce some savings in radio resources. The embodiment may also make call setup more robust, for example if there is packet loss in the network. In some cases call setup delay may be reduced. SDP can be carried within the session set-up protocol, for example in a SIP message which may be carried within a signalling PDP context or some other suitable PDP context. Therefore it is possible to avoid the problems caused by a non-existing PDP context for media.

BRIEF DESCRIPTION OF THE DRAWINGS

For better understanding of the invention, reference will now be made by way of example to the accompanying drawings in which.

DETAILED DESCRIPTION OF THE PREFERRED EMBODIMENTS

Certain embodiments of the present invention will be described by way of example, with reference to the exemplifying architecture of a third generation (3G) mobile communications system. However, it will be understood that embodiments may be applied to any other suitable form of communications system.

The Third Generation Partnership Project (3GPP) has defined a reference architecture for the third generation (3G) core network which will provide the users of user equipment with access to the multimedia services. This core network is divided into three principal domains. These are the Circuit Switched (CS) domain, the Packet Switched (PS) domain and the Internet Protocol Multimedia Subsystem (IMS) domain.

Figure 1:
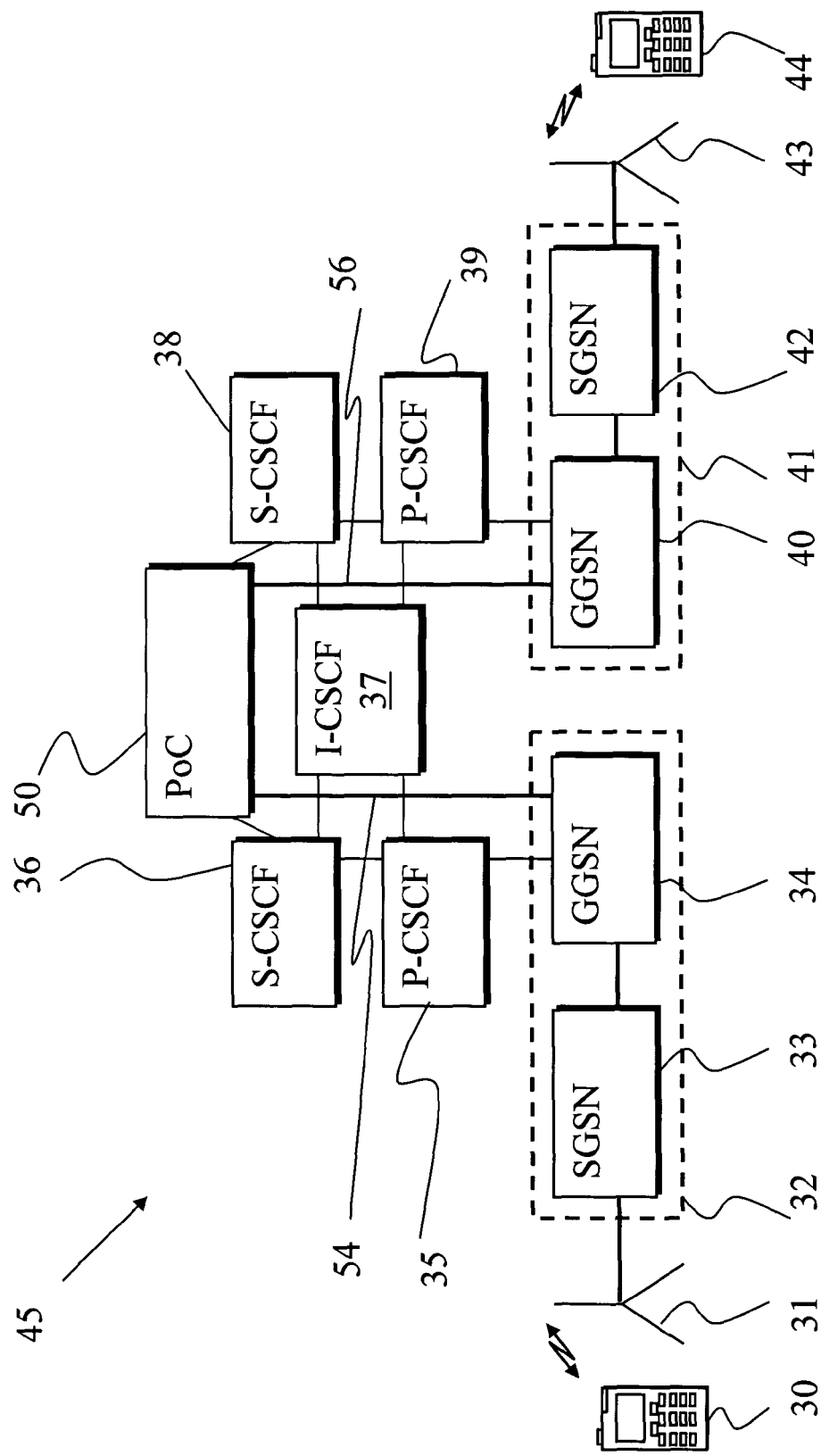
FIG. 1 shows a communication system wherein the invention may be embodied.

FIG. 1 shows an IP Multimedia Network 45 for offering IP multimedia services for IP Multimedia Network subscribers. IP Multimedia Subsystem (IMS) functionalities can be provided by means of a Core Network (CN) subsystem including various entities for the provision of the service. The third generation partnership project (3GPP) has defined use of the general packet radio service (GPRS) for the provision of the IMS services, and therefore a GPRS based system will be used in the following as an example of a possible backbone communication network enabling the IMS services.

A mobile communication system such as the 3G cellular system is typically arranged to serve a plurality of mobile user equipment usually via a wireless interface between a user equipment and base stations of the communication system. The mobile communication system may logically be divided between a radio access network (RAN) and a core network (CN). The core network (CN) entities typically include various control entities and gateways for enabling the communication via a number of radio access networks and also for interfacing a single communication system with one or more communication system such as with other cellular systems and/or fixed line communication systems.

In FIG. 1 the intermediate mobile communication network provides packet-switched data transmission in the packet switched domain between a support node and mobile user equipment. Different sub-networks are in turn connected to an external data network, e.g. to a public switched data network (PSPDN), via gateway GPRS support nodes (GGSN) 34, 40. The GPRS services thus allow transmission of packet data between mobile data terminals and/or external data networks. More particularly, the exemplifying general packet radio service (GPRS) operation environment comprises one or more sub-network service areas, which are interconnected by GPRS backbone networks 32 and 41. A sub-network comprises a number of packet data service nodes (SN). In this application the service nodes will be referred to as serving GPRS support nodes (SGSN). Each of the SGSNs 33, 42 is connected to at least one mobile communication network, typically to base station systems. Although not shown for clarity reasons, the connection may be provided by way of radio network controllers (RNC) or other access system controllers such as base stations controllers (BSC) in such a way that packet service can be provided for mobile user equipment via several base stations.

Base stations 31 and 43 are arranged to transmit signals to and receive signals from mobile user equipment 30 and 44 of mobile users i.e. subscribers via respective wireless interfaces. Correspondingly, each of the mobile user equipment is able to transmit signals to and receive signals from the base stations via the wireless interface. In the simplified presentation of FIG. 1, the base stations 31 and 43 belong to the respective radio access networks (RAN). In the shown arrangement each of the user equipment 30, 44 may access the IMS network 45 via the two access networks associated with base stations 31 and 43, respectively. It shall be appreciated that, although, for clarity, FIG. 1 shows the base stations of two radio access networks, a typical mobile communication network usually includes a number of radio access networks.

The IMS domain is for ensuring that multimedia services are adequately managed. The IMS domain commonly supports the Session Initiation Protocol (SIP) as developed by the Internet Engineering Task Force (IETF). Session Initiation Protocol (SIP) is an application-layer control protocol for creating, modifying and terminating sessions with one or more participants (endpoints). SIP was generally developed to allow for initiating a session between two or more endpoints in the Internet by making these endpoints aware of the session semantics. A user connected to a SIP based communication system may communicate with various entities of the communication system based on standardised SIP messages. User equipment or users that run certain applications on the user equipment are registered with the SIP backbone so that an invitation to a particular session can be correctly delivered to these endpoints. To achieve this, SIP provides a registration mechanism for devices and users, and it applies mechanisms such as location servers and registrars to route the session invitations appropriately. Examples of the possible sessions that may be provided by means of SIP signalling include Internet multimedia conferences, Internet telephone calls, and multimedia distribution.

A user equipment within the radio access network may communicate with a radio network controller via radio network channels which are typically referred to as radio bearers (RB). Each user equipment may have one or more radio network channel open at any one time with the radio network controller. Any appropriate mobile user equipment adapted for Internet Protocol (IP) communication may be used to connect the network. For example, a user may access the cellular network by means of a user equipment such as a Personal computer (PC), Personal Data Assistant (PDA), mobile station (MS) and so on. The following examples are described in the context of mobile stations.

One skilled in the art is familiar with the features and operation of a typical mobile station. Thus, a detailed explanation of these features is not necessary. It is sufficient to note that the user may use a mobile station for tasks such as for making and receiving phone calls, for receiving and sending data from and to the network and for experiencing e.g. multimedia content. A mobile station is typically provided with processor and memory means for accomplishing these tasks. A mobile station may include antenna means for wirelessly receiving and transmitting signals from and to base stations of the mobile communication network. A mobile station may also be provided with a display for displaying images and other graphical information for the user of the mobile user equipment. Speaker means may also be provided. The operation of a mobile station may be controlled by means of an appropriate user interface such as control buttons, voice commands and so on. Additionally, the various systems, nodes, components, servers, and elements depicted in FIG. 1, including, for example, GGSN 34, 40, base stations 31, 43, etc., may be implemented as computer-based devices configured to run computer code stored on non-transitory computer readable media to cause the various operations and functions described herein.

The mobile stations 30 and 44 of FIG. 1 are configured to enable use of the Push-to-talk type services. An activation function that may be required by a Push-to-talk service can be provided by one of the buttons on the normal keypad of the mobile stations 30 and 44, or by a specific tangent key, for example with a tangent known from the "Walkie-Talkie" devices. Other activation techniques such as voice activation may also be used. In the case of voice activation a detected sound may be used for triggering the set-up of the session for transmission of speech or other data. Instead of pressing a key, the user may also activate the service by means of an appropriate menu selection. The manner how a mobile station may activate the service is an implementation issue, and will therefore not be described in any more detail.

It shall be appreciated that although only two mobile stations are shown in FIG. 1 for clarity, a number of mobile stations may be in simultaneous communication with each base station of the mobile communication system. A mobile station may also have several simultaneous sessions, for example a number of SIP sessions and activated PDP contexts. The user may also have a phone call and be simultaneously connected to at least one other service.

Overall communication between user equipment in an access entity and a gateway GPRS support node is generally provided by a packet data protocol (PDP) context. Each PDP context usually provides a communication pathway between a particular user equipment and the gateway GPRS support node and, once established, can typically carry multiple flows. Each flow normally represents, for example, a particular service and/or a media component of a particular service. The PDP context therefore often represents a logical communication pathway for one or more flow across the network. To implement the PDP context between user equipment and the serving GPRS support node, radio access bearers (RAB) need to be established which commonly allow for data transfer for the user equipment. The implementation of these logical and physical channels is known to those skilled in the art and is therefore not discussed further herein.

The communication systems have developed such that services may be provided for the user equipment by means of various functions of the IMS network 45 that are handled by network entities known as servers. For example, in the current third generation (3G) wireless multimedia network architectures it is assumed that several different servers are used for handling different functions. These include functions such as the call session control functions (CSCFs). The call session control functions may be divided into various categories such as a proxy call session control function (P-CSCF) 35,39, interrogating call session control function (I-CSCF) 37, and serving call session control function (S-CSCF) 36,38.

It shall be appreciated that similar function may be referred to in different systems with different names. For example, in certain applications the CSCFs may be referenced to as the call session control functions.

Communication systems may be arranged such that a user who has been provided with required communication resources by the backbone network has to initiate the use of services by sending a request for the desired service over the communication system. For example, a user may request for a session, transaction or other type of communications from an appropriate network entity. Furthermore, the user needs to register his/hers user equipment in a serving control entity of the IMS. The registration is typically done by sending a user identity to the serving control entity. From the above discussed exemplifying network entities the serving call session control function (S-CSCF) forms in the 3G IMS arrangements the entity a user needs to be registered with in order to be able to request for a service by means of the IMS system.

The user equipment 30, 44 may connect, via the GPRS network, to application servers that are generally connected to the IMS. In FIG. 1 such an application server is provided by a push-to-talk over cellular (PoC) services server 50. The PoC application server is for providing push-to-talk over cellular (PoC) services over the IMS network 45. The push-to-talk service is an example of the so called direct voice communication services. Users who wish to use the PoC service may need to subscribe to an appropriate PoC server. The registration to the PoC service after the registration to the IMS may then be done by the IMS by any appropriate manner, for example by means of appropriate third party registration procedure or on request by the user.

The direct voice communication services are intended to use the capabilities of the GPRS backbone and the control functions of the Multimedia Subsystem (IMS) for enabling IP connections for the mobile stations 30 and 44. The PoC servers may be operated by the operator of the IMS system, or by a third party service provider. A more detailed explanation of how the service allows the user of the mobile station 30 to engage in immediate communication with the user of the mobile station 44 is given later in this description.

A user may open the communication link, for example, by simply pressing a specific activation button on the mobile station 30. While the user of the mobile station 30 speaks, the user of the mobile station 44 listens. The user of the mobile station 44 may then reply in similar manner.

The signaling between the user equipment and the appropriate call session control functions is routed via the GPRS networks. The user plane session set-up signaling for the user equipment is routed via and controlled by the PoC application server 50, i.e. the PoC controls both the control plane and the user plane of the PoC user. It shall be appreciated that the control plane traffic between the PoC application server and the user equipment is routed via the IMS 45 while the user plane traffic between the user equipment and the PoC application server is routed from the GPRS system to the PoC application server on interfaces 54 and 56.

The embodiments are based on the realisation that it might be advantageous if use of a specific state message could be avoided. For example, it might be advantageous to avoid using Real-time Transport protocol Control Protocol (RTCP) messages for communication of floor status information at the session set-up phase. In the following exemplifying embodiments, instead of having to indicate the initial floor control status in Push to talk session in a separate RTCP packet, the status is can be indicated in a Session Description Protocol (SDP) offer or answer. The provision of status information may be done by adding a single extension parameter to a SDP message with fixed token values describing the possible floor control states, such as floor granted or floor taken. Thus the SDP message may be used for exchange of media and floor control parameters.

Figure 2:
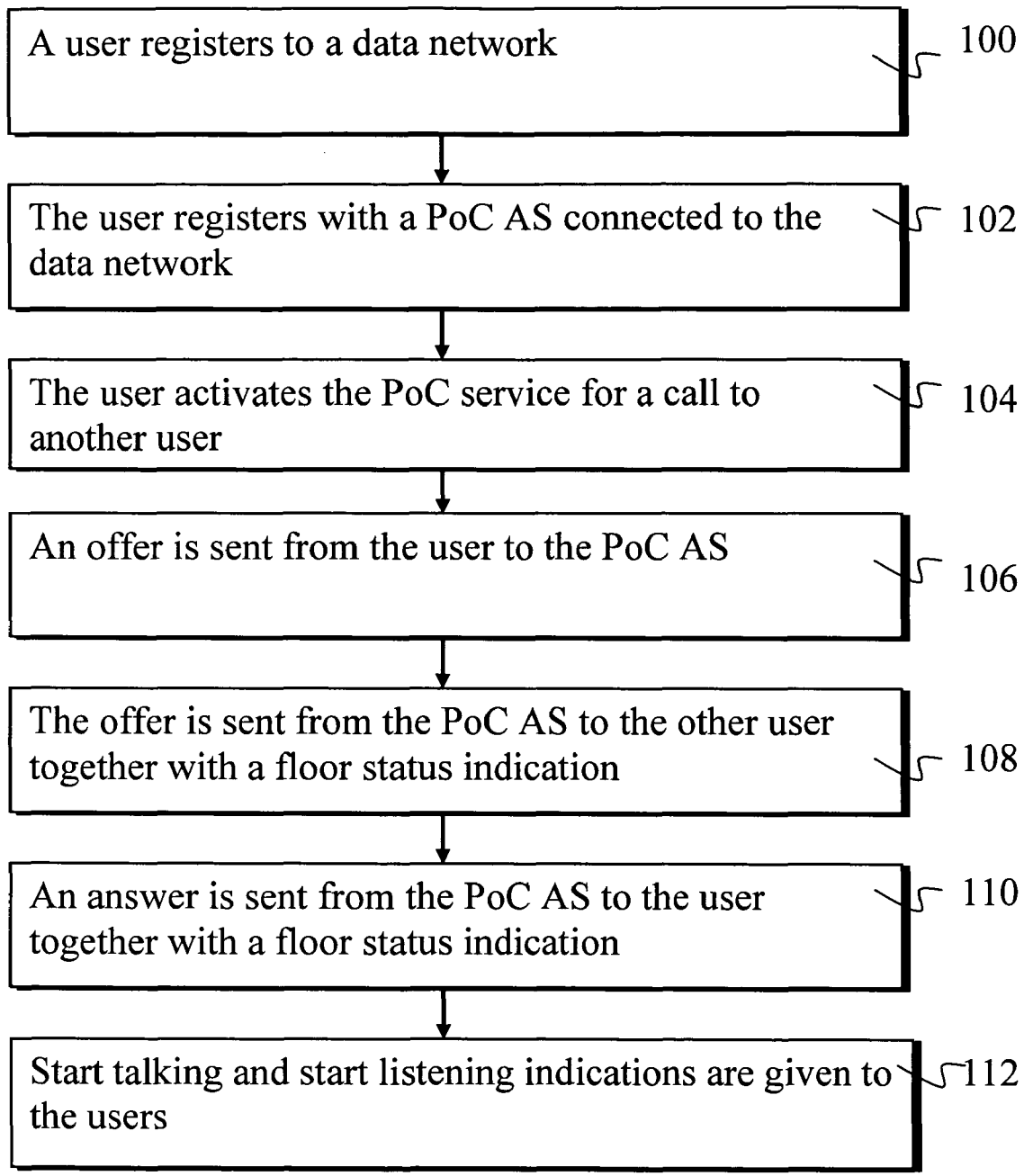
FIG. 2 is a flowchart illustrating the operation of one embodiment.

The following will describe with a reference to FIG. 2 an embodiment wherein A-party and B-party mobile stations are informed of the floor status right in the beginning of the negotiation for a communication session. In accordance with an embodiment the mobile stations may first be registered with an IMS, for example, with a respective serving CSCF. This is shown in step 100 of FIG. 2.

After the mobile stations are successfully registered at the IMS, the mobile stations may then be registered with a PoC application server at step 102. The registration at step 102 may occur substantially soon after the registration with the IMS at step 100. For example, after a mobile station is successfully registered with the IMS, a third party registration may be automatically carried out with the PoC application server at step 102. The third party registration may be performed by means of a SIP third party registration procedure between the IMS and the PoC application server. This may be done for each user who has subscribed to the PoC services. Thus the user may not need to take any action at this stage. Alternatively, the user or any other party may trigger the registration at any stage after the mobile station is registered with the IMS.

After registration a user may activate the PoC service, for example by pressing a Push-to-talk key on his mobile station at step 104. An offer is then sent from the calling party user equipment to the PoC application server at step 106. The offer may then be forwarded from the PoC application server at step 108 to the called party user equipment together with an indication regarding the status of the floor. An answer to the request is forwarded from the PoC application server at step 110 to the calling party user equipment, this message also including an indication regarding the status of the floor. It shall be appreciated that the answer may be communicated even if no answer has been yet received from the called party.

Instead of sending any initial RTCP floor granted (on caller side) and/or floor taken (on the called side) or similar messages, SDP messages may be used for the communication of the floor status information. The SDP answer on the calling party side at step 110 may carry information that the floor has been granted. The SDP offer on called party side at step 108 can be used to carry information that the floor has been taken. For this purpose a new attribute may be defined for the SDP so as to carry the floor control state. This may be done, for example, by means of the SDP extension model. The attribute may have enumerated values corresponding to the possible floor control states. The semantics of the attribute may be such that it is capable of informing the receiver of the initial state of the floor for the offered/answered media in question. The initial state indicated this way may be overridden by any subsequent RTCP floor control messages.

After the exchange of the media and floor status information, the calling and called partiers may be given at step 112 appropriate indications that the calling party may start talking and that the called party should start listening.

Figure 3:
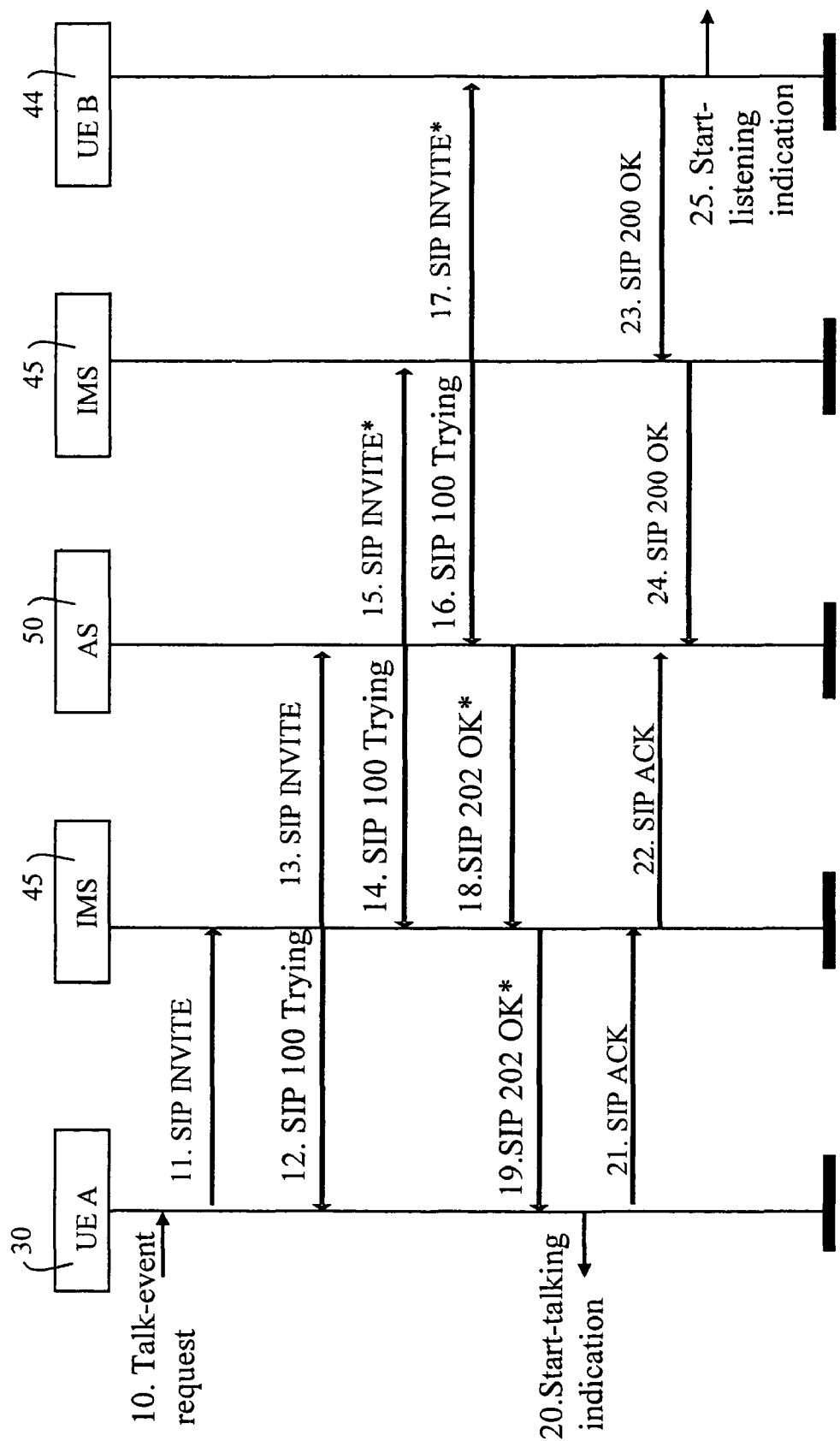
FIG. 3 is signaling flowchart illustrating the signaling of one embodiment.

FIG. 3 illustrates an example for possible signaling between an A-party user equipment 30, a PoC application server 50 and a B-party user equipment 44 after registration with the PoC application server. At step 10, the A-party gives an indication that he/she wishes to establish a speech connection with the B-party. The user equipment 30 may then send a 'SIP INVITE' message 11 to the IMS 45 to be routed to the PoC application server 50 for requesting for the speech connection with the B-party. The IMS may send a 'SIP 100 TRYING' message 12 back to the user equipment 30 in confirmation that it has received the request.

The IMS 45 forwards the 'SIP INVITE' as message 13 to the PoC application server 50. Upon receipt of this message, the application server may send a 'SIP 100 TRYING' message 14 back to the IMS in confirmation that it has received the request.

In FIG. 3 the floor status information is provided to the A-party and the B-party by the SIP messages 15, 17, 18 and 19 labelled with '*'. More particularly, in response to receiving the 'SIP INVITE' message 13, the PoC application server 50 may send a 'SIP INVITE*' message 15 to the IMS to be routed to the B-party user equipment 44. The IMS may send at this stage a 'SIP 100 TRYING' message 16 back to the application server to confirm that it has received the message. The IMS 45 forwards the 'SIP INVITE*' as message 17 to the PoC enabled B-party user equipment 44.

When the PoC application server 50 receives confirmation in message 16 from the IMS that it has received the request in message 15, the PoC application server may send an appropriate message 18 to the IMS. FIG. 3 shows 'SIP 2000K*' message. Any other appropriate message, for example a 'SIP 202 Accepted', may be sent at this stage. The acknowledgement of the receipt may be sent even before the B-party user equipment 44 has received the request or any indication that such a request might be expected. Contents of message 18 are then forwarded to the A-party user equipment 30 in message 19. Thus the A-party user equipment is provided with the floor status information by the SIP messages 18 and 19.

The SDP offer or answer may be configured as shown in the simplified example below. This example assumes that the extension attribute is called "floor-control-state". It shall be appreciated that the example does not show contain all possible PoC specific extensions. In the example below the indication is that the floor is taken. Other indications would be encoded with similar tokens.

Example m=audio [port number] RTP/AVP [payload number]
a=rtcp[RTCP port number]
a=floor-control-state:floorGranted In response to receiving message 19, the A-party user equipment 30 may then give an indication at step 20 to the user of the user equipment that he/she may start talking. Any subsequent messaging may be arranged in accordance with the SIP protocol. For example, the user equipment 30 may acknowledge the OK message by sending a 'SIP ACK' message 21 to the IMS. This message may then be forwarded to the PoC application server 50 as message 22.

Once the required processing is completed at the B-party user equipment 44 and the request can be fulfilled, a 'SIP 200 OK' message 23 is communicated to the IMS and further in message 24 to the PoC application server. The B-party user equipment 44 may also give a start listening indication to the user thereof at step 25. The B-party user may be provided with an indication of a coming PoC "talk" session just before talk burst from the A-party comes through.

It shall be appreciated that the above example relates to situation wherein the PoC application server is aware that the B-party user is reachable and does have an auto-answer function activated. The signal flows for different use scenarios may differ from that of the FIG. 3 example.

It shall be appreciated that although FIGS. 1 and 3 show and the above describes only one application server, for example a PoC server, a number of such servers may be provided. The A- and B-party user equipment may be registered with different application servers. The applications servers serving the A- and B-parties may even be located in different networks.

The above describes a general application server based solution for a time critical service like the PoC. However, it shall be appreciated that the invention may be applied to other services without departing from the spirit and scope thereof.

It shall also be appreciated that the embodiments are not limited to be used in association with RTCP based floor control and Session Description Protocol. Furthermore, the initial floor control state can be carried in any appropriate protocol message used for any offer and/or acceptance messages with similar fashion regardless what is the actual protocol used for floor control.

It should be appreciated that while embodiments of the invention have been described in relation to mobile stations, embodiments of the invention are applicable to any other suitable type of user equipment.

The examples of the invention have been described in the context of an IMS system and GPRS networks. This invention is also applicable to any other access techniques. Furthermore, the given examples are described in the context of SIP networks with SIP capable entities. This invention is also applicable to any other appropriate communication systems, either wireless or fixed line systems and standards and protocols.

It is also noted herein that while the above describes exemplifying embodiments of the invention, there are several variations and modifications which may be made to the disclosed solution without departing from the scope of the invention as defined in the appended claims.

The invention claimed is:

1. A method, comprising:
including, in a session description protocol message, generated in accordance with a session description protocol, floor status information of a data communication media in relation to a party of a communication session, the message configured as at least one of an offer and an answer of the session description protocol associated with a session initiation, the floor status information configured as a value representing at least one of: a floor granted, a floor taken, and a port number; and
sending the session description protocol message including the floor status information between a communication system and a user equipment in order to avoid sending additional messages to communicate the floor status information between the communication system and the user equipment.

2. A method as claimed in claim 1, wherein including further comprises including in the floor status information at least one fixed value representing the at least one of the floor granted and the floor taken.

3. A method as claimed in claim 2, further comprising:
sending the message as a session initiation protocol OK message.

4. A method as claimed claim 1, wherein the including of the floor status information comprises including the floor status information in an answer to an offer for the communication session.

5. A method as claimed in claim 4, further comprising:
including an indication that a floor is granted in the answer.

6. A method as claimed in claim 1, further comprising:
carrying the message in accordance with a session initiation protocol.

7. A method as claimed in claim 1, further comprising:
sending a request for a push-to-talk service session.

8. A method as claimed claim 1, further comprising:
sending the message over an internet protocol multimedia subsystem.

9. A method as claimed in claim 1, further comprising:
sending the message over a general packet radio service network.

10. A method as claimed in claim 1, further comprising:
providing the communication session using a packet data protocol context.

11. A method as claimed in claim 1, wherein the sending of the message comprises sending a message from an application server operatively connected to the communication system.

12. A method as claimed in claim 11, wherein the sending of the message comprises sending a message from a push-to-talk over cellular server.

13. A computer program embodied on a non-transitory computer readable medium comprising a program code configured to control a computer-based device to perform the following:
including, in a session description protocol message, generated in accordance with a session description protocol, floor status information of a data communication media in relation to a party of a communication session, the message configured as at least one of an offer and an answer of the session description protocol associated with a session initiation, the floor status information configured as a value representing at least one of: a floor granted, a floor taken, and a port number; and
sending the session description protocol message including the floor status information between a communication system and a user equipment in order to avoid sending additional messages to communicate the floor status information between the communication system and the user equipment.

14. A system, comprising:
a data network configured to provide data communication resources;
an application server configured to connect to the data communication network, wherein the application server is further configured to include in a session description protocol message, generated in accordance with a session description protocol, floor status information of a data communication media in relation to a party of a communication session, the message carrying data communication media information for the communication session, the application server further configured to send the session description protocol message including the floor status information to a user equipment via the data network in order to avoid sending additional messages to communicate the floor status information to the user equipment, the message configured as at least one of an offer and an answer of a session description protocol associated with a session initiation, the floor status information configured as a value representing at least one of: a floor granted, a floor taken, and a port number.

15. An apparatus, comprising:
a computer-based device configured to include, in a session description protocol message, generated in accordance with a session description protocol, floor status information of a data communication media in relation to a party of a communication session, the message configured as at least one of an offer and an answer of the session description protocol associated with a session initiation, the floor status information configured as a value representing at least one of: a floor granted, a floor taken, and a port number,
wherein the computer-based device is configured to send the session description protocol message including the floor status information to a user equipment via a data network in order to avoid sending additional messages to communicate the floor status information to the user equipment.

16. An apparatus as claimed in claim 15, further comprising:
a push-to-talk service application server.

17. An apparatus as claimed in claim 15, wherein the computer-based device is configured to connect to an internet protocol multimedia subsystem.

18. An apparatus as claimed in claim 15, wherein the computer-based device is configured to include the floor status information in at least one of an offer for the communication session or an answer to the offer for the communication session.

19. A system, comprising:
a node configured to transmit or receive a session description protocol message, generated in accordance with a session description protocol, describing a communication session, the message configured as at least one of an offer and an answer of the session description protocol associated with a session initiation, the floor status information configured as a value representing at least one of: a floor granted, a floor taken, and a port number; and
a computer-based device configured to send the session description protocol message including the floor status information in order to avoid sending additional messages to communicate the floor status information.

20. A system as claimed in claim 19, wherein the message is sent as a session initiation protocol OK message.

21. A system, comprising:
means for including in a session description protocol message, generated in accordance with a session description protocol, floor status information of a data communication media in relation to a party of a communication session, the message configured as at least one of an offer and an answer of the session description protocol associated with a session initiation, the floor status information configured as a value representing at least one of: a floor granted, a floor taken, and a port number; and
means for sending the session description protocol message including the floor status information between a communication system and a user equipment in order to avoid sending additional messages to communicate the floor status information between the communication system and the user equipment.

22. A system, comprising:
   data network for providing data communication resources; and
   application server for connecting to the data communication network, wherein the application server means includes in a session description protocol message, generated in accordance with a session description protocol, floor status information of a data communication media in relation to a party of a communication session, the message carrying data communication media information for the communication session and sends the message to a user equipment via the data network, the message configured as at least one of an offer and an answer of the session description protocol associated with a session initiation, the floor status information configured as a value representing at least one of: a floor granted, a floor taken, and a port number;
   wherein the session description protocol message including the floor status information is sent to the user in order to avoid sending additional messages to communicate the floor status information to the user.

23. An apparatus, comprising:
   means for including in a session description protocol message, generated in accordance with a session description protocol, floor status information of a data communication media in relation to a party of a communication session, the message carrying data communication media information for the communication session, the message configured as at least one of an offer and an answer of the session description protocol associated with a session initiation, the floor status information configured as a value representing at least one of: a floor granted, a floor taken, and a port number; and
   means for sending the session description protocol message including the floor status information to a user equipment via a data network in order to avoid sending additional messages to communicate the floor status information to the user equipment.

24. A method executed on a computer-based device, the method comprising:
   receiving, at the computer-based device, a session description protocol message, generated in accordance with a session description protocol, describing a communication session, wherein the message carries data communication media information for the communication session and floor status information of a data communication media in relation to a party of the communication session, wherein the message has been generated in accordance with the session description protocol associated with a session initiation, the floor status information configured as a value representing at least one of: a floor granted, a floor taken, and a port number; and
   indicating, at the computer-based device, the floor status information to the party;
   wherein the session description protocol message including the floor status information is sent in order to avoid sending additional messages to communicate the floor status information.

25. A method as claimed in claim 24, wherein the indicating the floor status information to the party comprises indicating that a floor is taken.

26. A method as claimed in claim 24, wherein the indicating the floor status information to the party comprises indicating that a floor is granted.

27. An apparatus, comprising:
   a memory to store program code; and
   a computer-based device, wherein the computer-based device is configured, when the program code is run on the computer-based device, to process a received session description protocol message, generated in accordance with a session description protocol, describing a communication session, wherein the message carries data communication media information for the communication session and floor status information of a data communication media in relation to a party of the communication session, wherein the message has been generated in accordance with the session description protocol associated with a session initiation, the floor status information configured as a value representing at least one of: a floor granted, a floor taken, and a port number, and wherein the computer-based device and memory are further configured to provide an indication of the floor status information to the party;
   wherein the session description protocol message including the floor status information is sent in order to avoid sending additional messages to communicate the floor status information.

28. An apparatus as claimed in claim 27, wherein the computer-based device is configured to indicate that a floor is taken.

29. An apparatus as claimed in claim 27, wherein the computer-based device is configured to indicate that a floor is granted.

30. A computer program embodied on a non-transitory computer readable medium comprising a program code configured to control a computer-based device to perform the following:
   receiving a session description protocol message, generated in accordance with a session description protocol, describing a communication session, wherein the message carries data communication media information for the communication session and floor status information of a data communication media in relation to a party of the communication session, wherein the message has been generated in accordance with the session description protocol associated with a session initiation, the floor status information configured as a value representing at least one of a floor granted, a floor taken, and a port number; and
   indicating the floor status information to the party;
   wherein the session description protocol message including the floor status information is sent in order to avoid sending additional message to communicate the floor status information.

31. A computer program as claimed in claim 30, wherein the indicating the floor status information to the party comprises indicating that a floor is taken.

32. A computer program as claimed in claim 30, wherein the indicating the floor status information to the party comprises indicating that a floor is granted.

* * * * *